(12) United States Patent
Noguchi et al.

(10) Patent No.: US 10,746,856 B2
(45) Date of Patent: Aug. 18, 2020

(54) LIGHT SCANNING TYPE OBJECT DETECTING DEVICE

(71) Applicant: Konica Minolta, Inc., Tokyo (JP)

(72) Inventors: Kazutaka Noguchi, Hachioji (JP); Ryouta Ishikawa, Hino (JP); Kazuki Matsui, Higashiyamato (JP)

(73) Assignee: KONICA MINOLTA, INC., Tokyo (JP)

( * ) Notice: Subject to any disclaimer, the term of this patent is extended or adjusted under 35 U.S.C. 154(b) by 272 days.

(21) Appl. No.: 15/767,702

(22) PCT Filed: Oct. 4, 2016

(86) PCT No.: PCT/JP2016/079409
§ 371 (c)(1),
(2) Date: Apr. 12, 2018

(87) PCT Pub. No.: WO2017/065048
PCT Pub. Date: Apr. 20, 2017

(65) Prior Publication Data
US 2018/0306906 A1    Oct. 25, 2018

(30) Foreign Application Priority Data
Oct. 16, 2015   (JP) .................. 2015-204193

(51) Int. Cl.
| G01C 3/08 | (2006.01) |
| G01S 7/481 | (2006.01) |
| G02B 5/09 | (2006.01) |
| G01S 17/931 | (2020.01) |
| G01S 17/42 | (2006.01) |
| G02B 26/12 | (2006.01) |

(52) U.S. Cl.
CPC .......... G01S 7/4817 (2013.01); G01S 7/4813 (2013.01); G01S 17/42 (2013.01); G01S 17/931 (2020.01); G02B 5/09 (2013.01); G02B 26/129 (2013.01)

(58) Field of Classification Search
CPC .... G01S 7/4817; G01S 17/931; G01S 7/4813; G01S 17/42; G02B 5/09; G02B 26/129
See application file for complete search history.

(56) References Cited

FOREIGN PATENT DOCUMENTS

| JP | S50-109737 A | 8/1975 |
| JP | H06-324274 A | 11/1994 |
| JP | 2014029317 A | 2/2014 |
| WO | 2014168137 A1 | 10/2014 |

OTHER PUBLICATIONS

International Search Report dated Dec. 6, 2016 for PCT/JP2016/079409 and English translation.

*Primary Examiner* — Samantha K Abraham
(74) *Attorney, Agent, or Firm* — Lucas & Mercanti, LLP

(57) ABSTRACT

A light scanning type object detecting device includes a mirror unit in which first and second mirror surfaces are formed so as to incline in respective directions intersecting with a rotation axis and to face each other with a predetermined angle, a light source; and a light receiving element. On the assumption that H represents a distance between an intersection point of extension lines of lateral sides and a bottom side in the first mirror surface, r represents a radius of a received light flux, h represents a distance between the center of the received light flux and the bottom side, and H' represents a distance between a top side and the bottom side, formulas (1) and (2) are satisfied.

when $r<0.4H$, $0.1<h/H\le(H'-r)/H$     (1)

when $r\ge0.4H$, $0.2<h/H\le(H'-r)/H$     (2)

5 Claims, 15 Drawing Sheets

LIGHT SCANNING TYPE OBJECT DETECTING DEVICE

CROSS REFERENCE TO RELATED APPLICATION

This Application is a 371 of PCT/JP2016/079409 filed on Oct. 4, 2016, which, in turn, claimed the priority of Japanese Patent Application No. JP 2015-204193 filed on Oct. 16, 2015, both applications are incorporated herein by reference.

TECHNICAL FIELD

The present invention relates to a light scanning type object detecting device capable of detecting a distant object.

BACKGROUND ART

In recent years, in the fields, such as a car and a flight object, in order to detect obstacles existing forward in a travelling direction, for example, a light scanning type object detecting device that emits a laser beam while scanning, receives reflected light that hits an object and is reflected from it, and obtains information regarding the obstacles on the basis of a time difference between the time of emitting light and the time of receiving the light, has been developed and already put in practical use.

Such an object detecting device can be applied, in addition to the above-mentioned obstacle detection for a movable body, to crime prevention use for detecting suspicious person by disposing it under the eaves of buildings, geographical feature investigation use for acquiring geographical feature information from the sky by mounting it in a helicopter, an airplane, etc., and gas detection use for measuring the gas concentration in atmospheric air.

In a general light scanning type object detecting device, a light projecting system is constituted by laser diodes as a light source and a collimating lens, a light receiving system is constituted by a light receiving lens (or mirror) and a photodetector, such as photodiode, and, further, a reflective mirror provided with a reflective surface is disposed between the light projecting system and the light receiving system. In such a laser scanning type object detecting device, light emitted from a light projecting system is projected so as to perform scanning by the rotation of a reflective mirror, whereby there are merits that not only measurement is performed for one point, but also measurement can be performed two dimensionally for an object in a wide range. In this connection, as a light source, in addition to the laser, LED etc. may be used.

In the case of taking a laser light source for an example, as a scanning method for a general laser light flux, a technique has been known that projects a laser light flux onto a mirror or a polygon mirror with a plurality of mirror surfaces, and oscillates the mirror or rotates the polygon mirror, whereby the laser light flux is made to scan.

Patent Literature 1 discloses a constitution in which a first reflective surface and a second reflective surface are formed with a nipping angle of 90 degrees between them on a rotation mirror, and a light flux is emitted from a light source along a direction orthogonal to the rotation axis, is reflected two times on the first reflective surface and the second reflective surface, and then performs scanning, whereby the disorder of a scanning line is not caused even if a rotation axis inclines due to rotation fluctuation. Moreover, Patent Literature 2 discloses a laser radar in which a plurality of pairs of first mirror and the second mirror are disposed, and an intersecting angle between the first mirror and the second mirror is changed for each of the plurality of pairs, whereby scanning can be performed for a plurality of different sub-scanning positions by one rotation.

CITATION LIST

Patent Literature

PTL 1: Japanese Unexamined Patent Publication No. S50-109737A
PTL 2: International Unexamined Patent Publication No. WO2014/168137

SUMMARY OF INVENTION

Technical Problem

In the case of the above-described object detecting devices that projects a light flux to scan by rotating a mirror, it is necessary to dispose other members not to interfere with the rotation locus of the mirror. For this reason, in order to attain the miniaturization of an object detecting device, it is necessary to restrict the outer form of a mirror such that the rotation locus of the mirror becomes small. On the other hand, in the case where the outer form is restricted such that the rotation locus becomes small, depending on a positional relationship between the mirror and a received light flux, vignetting (protrusion of a light flux from a mirror surface) of a received light flux tends to occur easily on the both ends of a peripheral portion of a scanning range, i.e., on a position where the rotation angle of the mirror at the time of scanning is large, and the utilization efficiency of a received light flux may lower. Accordingly, there is a possibility that the detection performance may lower on the both ends of a peripheral portion of a scanning range. However, each of Patent Literatures 1 and 2 does not teach the problem of the vignetting of a light flux on the both ends of a peripheral portion of a scanning range. Therefore, they do not suggest also a countermeasure for it.

The present invention has been achieved in view of the above-mentioned circumstances, and an object is to provide a light scanning type object detecting device that, while being small-sized, can suppress lowering in mirror utilization efficiency of a received light flux on the both ends of a peripheral portion with respect to the central portion of a scanning range, and with this, can be secure sufficient object detection performance.

Solution to Problem

In order to realize at least one of the above-mentioned object, a light scanning type object detecting device which reflects one aspect of the present invention, includes
  a mirror unit in which a first mirror surface and a second mirror surface are formed so as to incline in respective directions intersecting with a rotation axis and to face each other with a predetermined angle;
  a light source; and
  a light receiving element,
  wherein the light scanning type object detecting device is configured such that a light flux emitted from the light source is reflected on the first mirror surface, thereafter, reflected on the second mirror surface, and projected so as to scan by rotation of the mirror unit, and among the light flux projected so as to scan, a part of the light flux scattered on an object is reflected on the second mirror surface, thereafter, reflected on the first mirror surface, and received by the light receiving element, wherein in the mirror unit, a part of each of the first mirror surface and the second mirror surface that exceeds a predetermined distance from the rotation axis in a direction orthogonal to the rotation axis, is cut out, and wherein H represents a distance in a direction of the rotation axis between an intersection point of extension lines of lateral sides of the first mirror surface and a first point on the first mirror surface that is most separated from the intersection point in the direction of the rotation axis; r represents a radius of a circle in a case where an area of a region of a received light flux received by the light receiving element when the received light flux positioned to confront the first mirror surface is viewed from a direction orthogonal to the optical axis, is converted into the circle; h represents a distance in the direction of the rotation axis between the first point and a gravity center of a region of a received light flux when the received light flux positioned to confront the first mirror surface is viewed from the direction orthogonal to the optical axis; and H' represents a distance in the direction of the rotation axis between the first point and a second point on the first mirror surface that is most separated from the first point in the direction of the rotation axis, formulas (1) and (2) are satisfied.

$$\text{when } r<0.4H, \ 0.1<h/H\leq(H'-r)/H \tag{1}$$

$$\text{when } r\geq 0.4H, \ 0.2<h/H\leq(H'-r)/H \tag{2}$$

Advantageous Effects of Invention

According to the present invention, it is possible to provide a light scanning type object detecting device that, while being small-sized, can suppress lowering in mirror utilization efficiency of a received light flux on the both ends of a peripheral portion with respect to the central portion of a scanning range, whereby sufficient object detecting performance can be secured.

DESCRIPTION OF EMBODIMENTS

Figure 1:
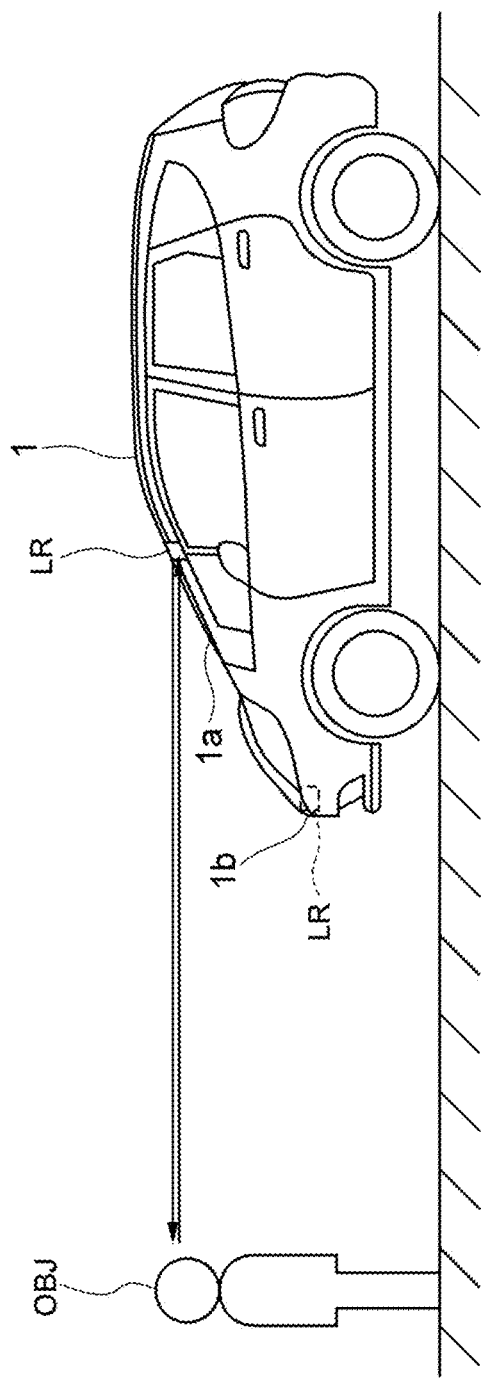
FIG. 1 is a schematic diagram showing a state where a laser radar as a light scanning type object detecting device according to the present embodiment is mounted on a vehicle.

Hereinafter, with reference to the attached drawings, an embodiment of the present invention will be described. FIG. 1 is a schematic diagram showing a state where a laser radar serving as a light scanning type object detecting device according to the present embodiment is mounted on a vehicle. A laser radar LR of the present embodiment is disposed inside the upper end of a front window 1*a* of a vehicle 1. However, it may be arranged outside the vehicle 1 (behind a front grille 1*b*, etc.) other than it.

Figure 2:
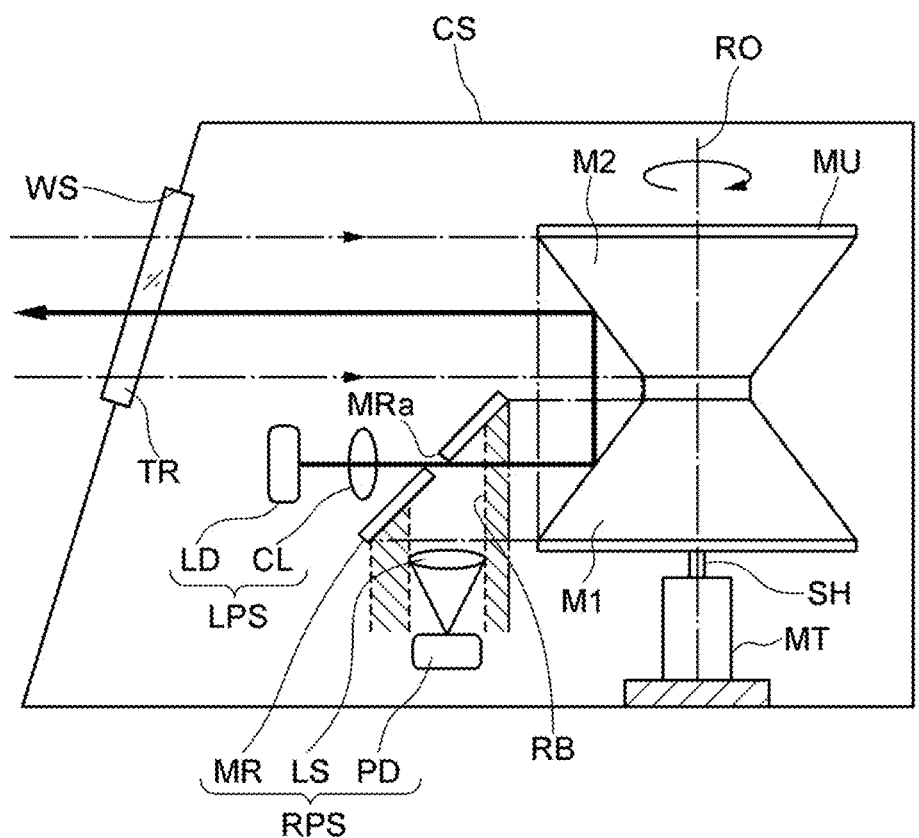
FIG. 2 is a cross section of a laser radar LR according to the present embodiment.
Figure 3:
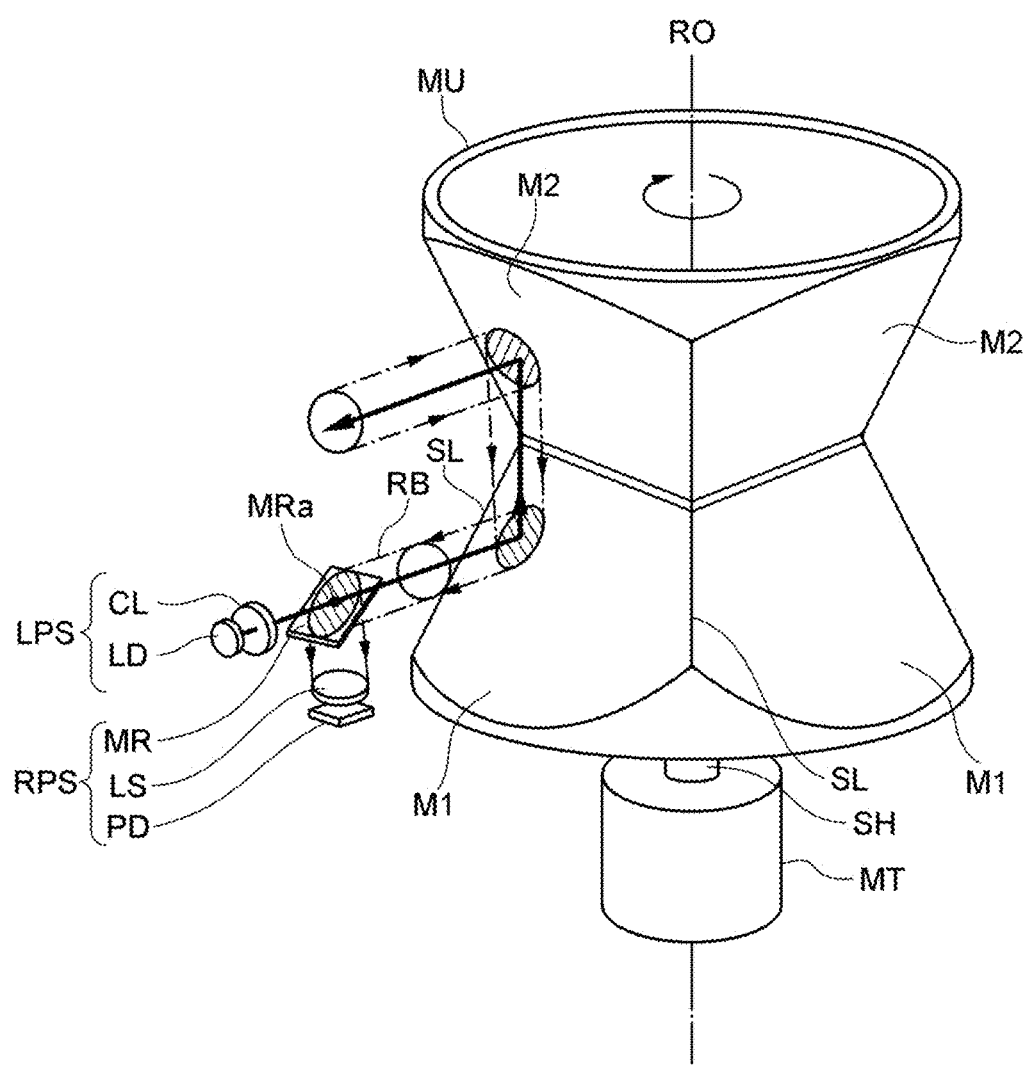
FIG. 3 is a perspective view showing a principal part, except a casing, of a laser radar LR according to the present embodiment.

FIG. 2 shows a cross section of the laser radar LR according to the present embodiment, and FIG. 3 is a perspective view showing a principal part of the laser radar LR except a casing according to the present embodiment. However, a form, length, etc. of constituent components may be different from the actual components. As shown in FIG. 2, the laser radar LR is accommodated in the inside of a casing CS. On a side of the casing CS, a window portion WS through which a light flux can enter or exit, is formed, and the window-portion WS is constituted by a transparent plate TR, such as glass and resin.

As shown in FIGS. 2 and 3, the laser radar LR includes, for example, a pulse type semiconductor laser (light source) LD that emits a laser light flux, a collimating lens CL that narrows the divergence angle of divergent light flux from the semiconductor laser LD and converts the light flux into a substantially parallel light flux, a mirror unit MU that projects and scans the laser light flux made to substantially parallel by the collimating lens CL toward an object OBJ side (FIG. 1) with a rotating mirror surface and reflects the scattered light flux from the object OBJ having been projected with the scanning light flux, an optical element MR that bends the optical path of the scattered light flux having come from the object OBJ and reflected on the mirror unit MU, a lens LS that collects the reflected light flux reflected on the optical element MR, and a photodiode (light receiving element) PD that receives the light flux collected by the lens LS. In the present embodiment, as shown in FIG. 3, an emitted light flux and a received light flux are superimposed on each other.

The semiconductor laser LD and the collimating lens CL constitute a light projecting system LPS, and the optical element MR, the lens LS, and the photodiode PD constitute a light receiving system RPS. The optical axis of the light projecting system LPS and the light receiving system RPS from a first mirror surface M1 to the optical element MR is substantially orthogonal to the rotation axis RO of the mirror unit MU. In the optical element MR disposed in the optical path of an emitted light flux and a received light flux, a hole MRa through which an emitted light flux having passed through the collimating lens CL passes is formed. In the present embodiment, the hole MRa is a transmissive portion that transmits an emitted light flux, and a reflective surface other than the hole MRa constitutes a reflective portion that reflects a received light flux. In this connection, the transmissive portion may be merely a transmissive surface instead of the hole MRa. Moreover, the light projecting system LPS and the light receiving system RPS are replaced in an arrangement opposite to the arrangement shown in FIG. 2, and may be constituted such that an emitted light flux from the collimating lens CL is reflected on the reflective portion by the optical element MR and guided to the mirror surface M1, and that a received light flux is transmitted through the transmissive portion, collected by the lens LS, and guided to the photodiode (light receiving element) PD. Moreover, a half mirror may be used as the optical element MR. In the case of using the half mirror, a surface on which a half mirror film is film-formed, serves both as a transmissive portion and a reflective portion.

The mirror unit MU has a form shaped like that two quadrangular pyramids are arranged in respective directions reverse to each other and joined to each other into one body. That is, the mirror unit MU includes four pairs of mirror surfaces M1 and M2 facing each other as one pair. The respective intersecting angles of the mirror surfaces M1 and M2 of four pairs are different from each other. It is desirable that the mirror surfaces M1 and M2 each inclining to the rotation axis RO are formed by vapor depositing reflective films on the surfaces of a resin material (for example, PC) shaped in the form of the mirror unit. The mirror unit MU is connected with the shaft SH of a motor MT so as to be driven and rotated.

Figure 4:
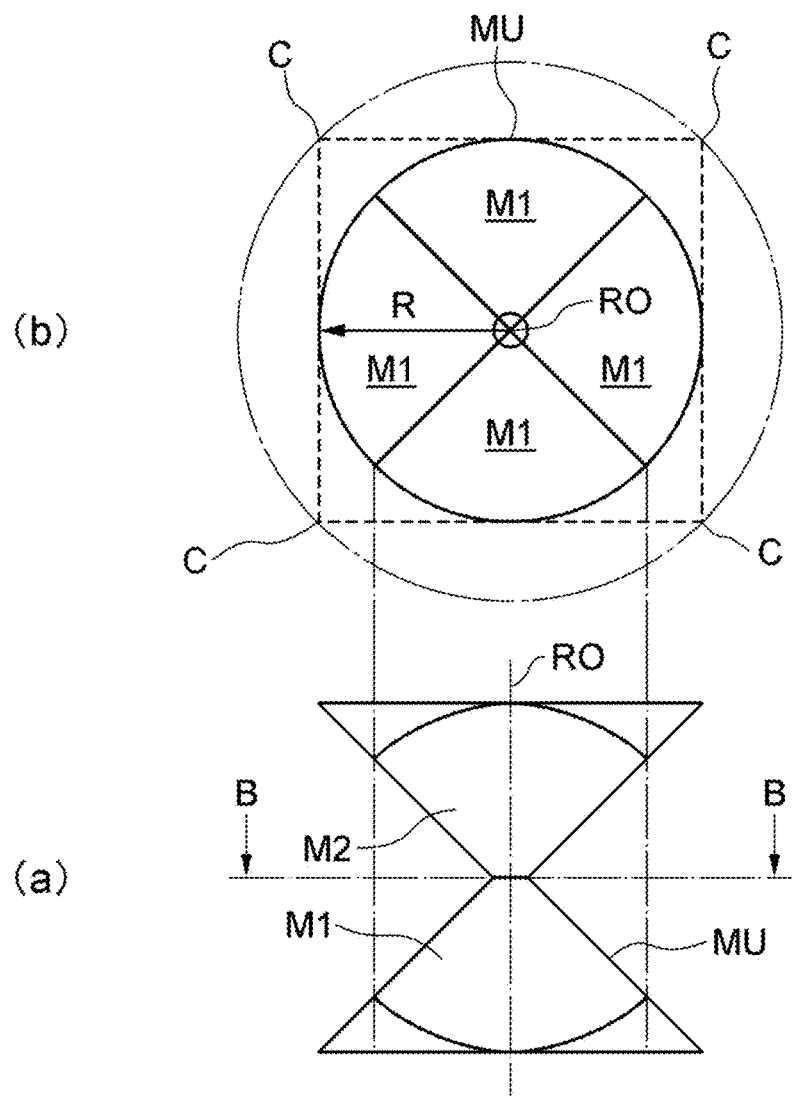
FIG. 4(*a*) is an outline side view of a mirror unit MU, and FIG. 4(*b*) is a view looking a constitution shown in FIG. 4(*a*) cut along a B-B line, in an arrow direction.

FIG. 4(a) is a schematic side view of the mirror unit MU, and FIG. 4(b) is a figure in which a constitution shown in (a) is cut along a B-B line and viewed in an arrow direction. In the case where the mirror unit MU is constituted such that quadrangular pyramids are connected with each other as shown with a broken line in FIG. 4, and in the case where the mirror unit MU is rotated as shown in FIG. 4(b), the circumscribed circle of four corner portions C indicated with a one dot chain line becomes the rotation locus of the corner portions C of the mirror unit MU. Accordingly, the rotation locus needs a large space, and other components are required to avoid interference with the rotation locus. For this reason, this matter becomes an obstacle to miniaturization of the mirror unit MU, eventually, the laser radar LR. Then, in the present embodiment, it is constituted like that the mirror surfaces M1 and M2 are cut off at a position of a radius R as a predetermined distance from the rotation axis RO. In this case, the rotation locus of the mirror unit MU becomes a circle with a radius R as shown with a solid line. In this connection, depending on the inclination of the mirror surface or the setting of the radius R, it may have an edge. With this, a space required for the rotation of the mirror unit MU can be made small, and the miniaturization, eventually, the miniaturization of the laser radar LR can be attained. However, with such a form, on the outer peripheral surface of the mirror unit MU, surfaces (for example, cylinder surface) other than the mirror surfaces M1 and M2 may take place. Accordingly, at the time of rotation of the mirror unit MU, it becomes easier to cause a problem of the vignetting of a received light flux. Such a problem will be mentioned later.

Next, the object detecting operation of the laser radar LR is described. In FIGS. 2 and 3, a divergent light flux intermittently emitted in a pulse form from the semiconductor laser LD, is converted into a substantially parallel light flux by the collimating lens CL, passes through the hole MRa of the optical element MR, enters the first mirror surface M1 of the rotating mirror unit MU, is reflected on there, further reflected on the second mirror surface M2, thereafter, passes through the transparent plate TR, and then is projected to scan, for example, as a laser spot light flux with a vertically-long rectangular cross section toward an external object OBJ side. In this connection, a substantially parallel light flux emitted from the collimating lens CL is configured to pass through the inside of a region (indicated with hatching in FIG. 3) where a received light flux RB occupies on the first mirror surface M1.

Figure 5:
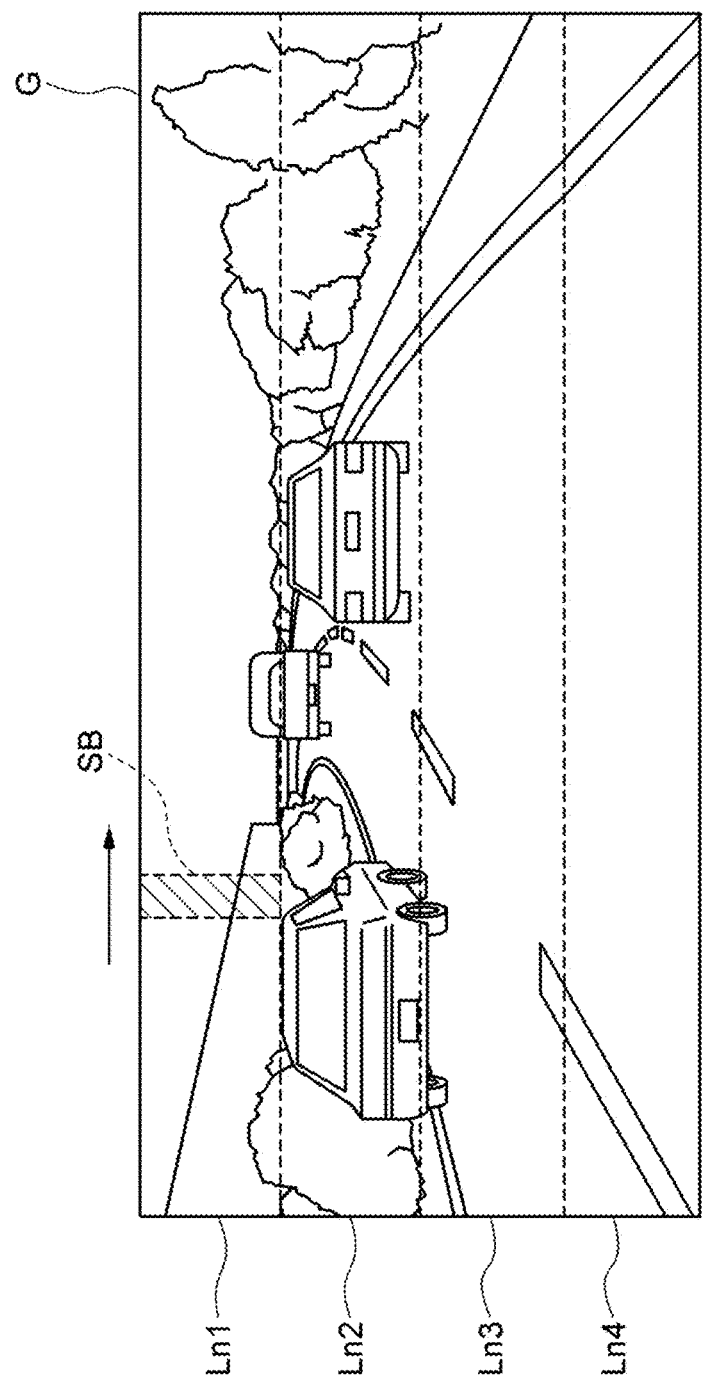
FIG. 5 is an illustration showing a state where scanning is performed within a detection range of a laser radar LR with a laser spot light flux SB (indicated with hatching) emitted correspondingly to the rotation of a mirror unit MU.

FIG. 5 is an illustration showing a state where the laser radar LR scans within its detection range G with a laser spot light flux SB (indicated with hatching) emitted in accordance with rotation of the mirror unit MU. In the combinations of the first mirror surface M1 and the second mirror surface M2 in the mirror unit MU, the respective intersecting angles of the combinations are different from each other. The laser spot light flux is reflected sequentially by the rotating first mirror surface M1 and second mirror surface M2. First, the laser spot light flux reflected by the first mirror surface M1 and the second mirror surface M2 of the first pair is made to scan horizontally from the left to the right on a region Ln1 at the top of the detection range G correspondingly to the rotation of the mirror unit MU. Next, the laser spot light flux reflected by the first mirror surface M1 and the second mirror surface M2 of the second pair is made to scan horizontally from the left to the right on a region Ln2 at the second from the top of the detection range G correspondingly to the rotation of the mirror unit MU. Next, the laser spot light flux reflected by the first mirror surface M1 and the second mirror surface M2 of the third pair is made to scan horizontally from the left to the right on a region Ln3 at the third from the top of the detection range G correspondingly to the rotation of the mirror unit MU. Next, the laser spot light flux reflected by the first mirror surface M1 and the second mirror surface M2 of the fourth pair is made to scan horizontally from the left to the right on a region Ln4 at the bottom of the detection range G correspondingly to the rotation of the mirror unit MU. With this, the scan for the whole detection range G for the first time has been completed. Successively, after the mirror unit MU has rotated one time, when the first mirror surface M1 and the second mirror surface M2 of the first pair returns, the scanning from the region Ln1 at the top of the detection range G to the region Ln4 at the bottom is repeated again.

In FIGS. 2 and 3, a part of the scattered light flux scattered by hitting an object OBJ among a light flux projected as a scanning light flux passes again through the transparent plate TR, enters the second mirror surface M2 of the mirror unit MU in the casing CS, is reflected thereon, further reflected on the first mirror surface M1, thereafter, is reflected on the optical element MR, is collected by the lens LS, and is detected with the receiving surface of the photodiode PD. In a non-illustrated circuit, a distance to the object OBJ can be found by obtaining a time difference between the time of emitting in the semiconductor laser LD and the time of detecting in the photodiode PD.

However, even if the scattered light flux from the object OBJ is reflected on the entire surface of each of the second mirror surface M2, the first mirror surface M1, and the optical element MR, since the scattered light flux is narrowed with the lens LS (here, assuming that it is a circle, but not limited to a circle) functioning as an aperture diaphragm, a light flux that enters the photodiode PD finally, is a part of it. That is, the scattered light flux indicated with hatching in FIG. 2 does not enter the photodiode PD, and is not used for light receiving. Here, it is assumed that a light flux collected by the lens LS is made as a received light flux RB, as indicated with a one dot chain line in FIG. 3, the received light flux RB with a prescribed cross section enters the lens LS via the second mirror surface M2, the first mirror surface M1, and the optical element MR. The cross section of the received light flux RB is not necessarily limited to a circular cross section, but description is given on the assumption that it is a circular cross section.

Figure 6:
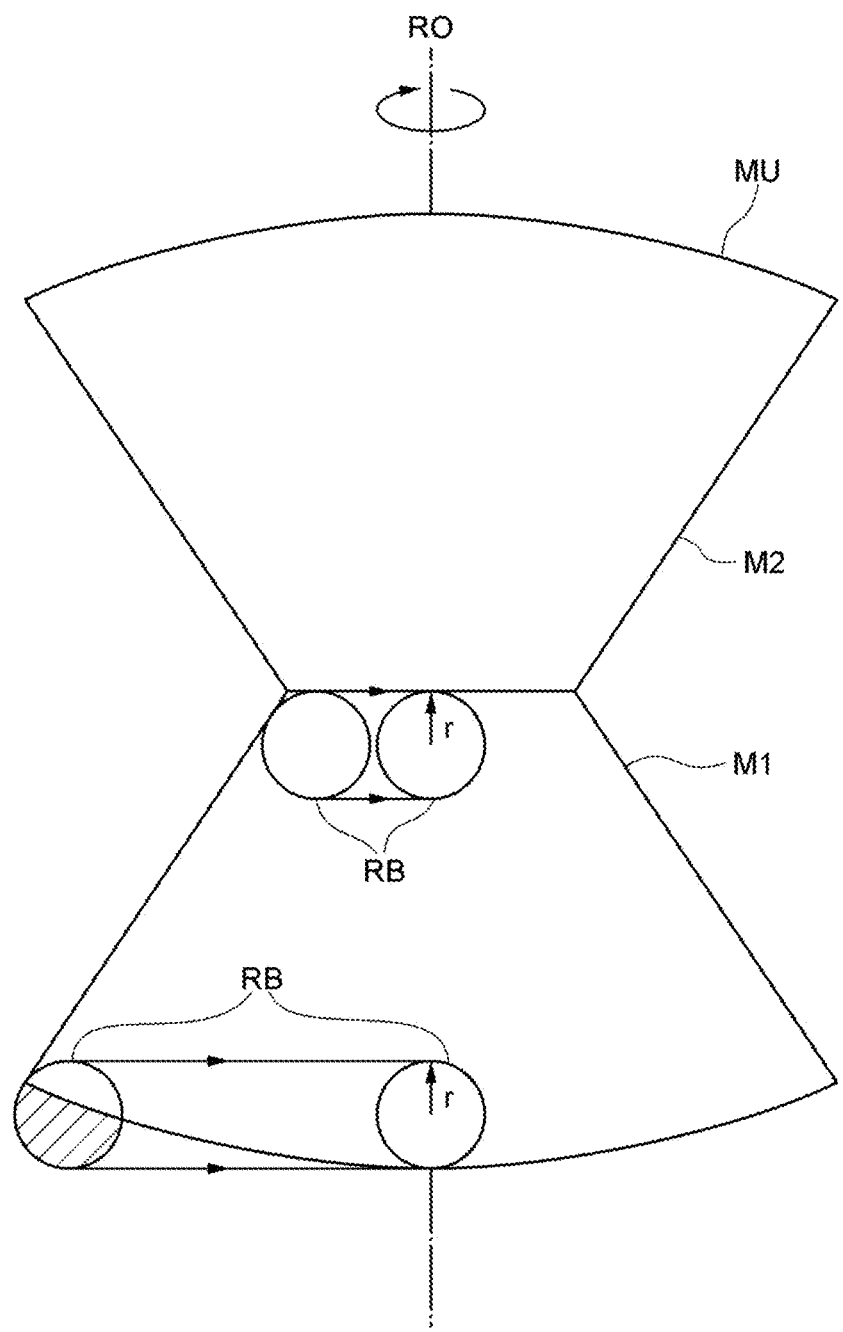
FIG. 6 is an illustration showing a region (entering position) where a received light flux RB occupies on a first mirror surface M1, with a circle.

In FIG. 6, a region (an incident region on the lens LS) where the received light flux RB occupies on the first mirror surface M1 is indicated with a circle. When the mirror unit MU rotates around the rotation axis RO, although the received light flux RB will move horizontally from an end of the first mirror surface M1 to another end, by securing the moving length as long as possible, it is possible to suppress the vignetting of the received light flux RB. At this time, in the case where the reflection position of the received light flux RB on the first mirror surface M1 approaches too close to the second mirror surface M2 so that a part of the received light flux RB protrudes into the second mirror surface M2 side, the amount of received light of the photodiode PD decreases. On the other hand, in the case where the reflection position of the received light flux RB on the first mirror surface M1 is separated too far from the second mirror surface M2, since the first mirror surface M1 has been cut off at a position of a radius R from the rotation axis RO (refer to FIG. 4), a part of the received light flux RB (a portion indicated with hatching in FIG. 6) protrudes from the first mirror surface M1, the amount of received light of the photodiode PD decreases similarly. Then, in the present embodiment, as shown in the following formula (1) or (2), the position of the received light flux RB on the first mirror surface M1 is regulated. With this, while being small-sized, it becomes possible to provide a laser radar LR that can suppress lowering in mirror utilization efficiency of a received light flux on the both ends of the peripheral portion of a scanning range, and has secured sufficient object detection performance.

Figure 7:
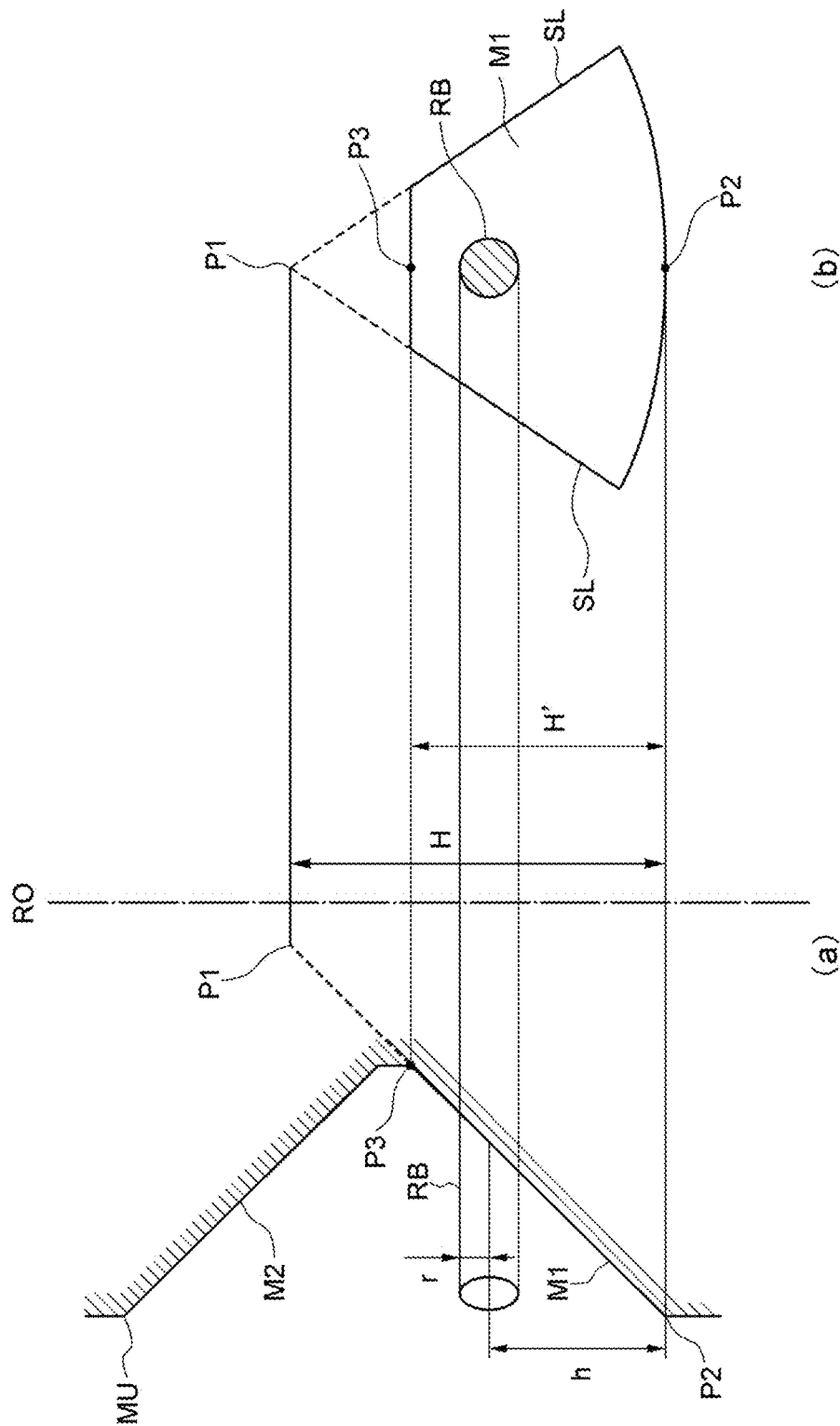
FIG. 7(*a*) is an illustration showing a cross section of a mirror unit MU, and FIG. 7(*b*) is an illustration showing a front view of a first mirror surface M1.

FIG. 7(a) shows a cross section of the mirror unit MU, and FIG. 7(b) shows a front view of the first mirror surface M1. Herein, on the assumption that as shown in FIG. 7(b), H represents a distance in the direction of the rotation axis RO between an intersection point P1 of the extension lines of lateral sides SL of the first mirror surface M1 and a point (a first point) P2 on the first mirror surface M1 that is most separated from the intersection point P1 in the direction of the rotation axis RO; r represents a radius of a circle in the case where the area of the region of a received light flux RB when the received light flux RB positioned to confront the first mirror surface is viewed from the direction orthogonal to the optical axis, is converted into a circle with an equal area; h represents a distance in the direction of the rotation axis RO between the point P2 and the gravity center of the region of a received light flux RB when the received light flux RB positioned to confront the first mirror surface M1 is viewed from the direction orthogonal to the optical axis (in the example shown in the figure, the center of the received light flux RB); and H' represents a distance in the direction of the rotation axis RO between the point P2 and a point (a second point) P3 on the first mirror surface M1 that is most separated from the point P2 in the direction of the rotation axis RO, by constituting so as to satisfy the following formulas, it becomes possible to suppress lowering in light receiving efficiency even at an end of a scanning range, and to secure sufficient object detecting performance.

At the time of $r<0.4H$, $0.1<h/H\leq(H'-r)/H$ (1)

At the time of $r\geq 0.4H$, $0.2<h/H\leq(H'-r)/H$ (2)

The upper limit of each of the formulas (1) and (2) is described. In the case where a part of the received light flux RB deviates from the first mirror surface M1, a part of the deviated received light flux RB is no longer received by the photodiode PD, and lowering in detection efficiency will be caused. Then, it is necessary to reflect all the received light flux RB on the first mirror surface M1. In more concrete terms, with reference to FIG. 7, in the case where h becomes larger than (H'−r), a "protruding" region occurs such that a light flux with a radius r protrudes from the first mirror surface M1 into the second mirror surface M2 side. In this case, vignetting occurs in the received light flux RB. In order to avoid this, it is necessary to make h equal to or less than (H'−r), and, with this, the upper limit of each of the formulas (1) and (2) is determined.

On the other hand, with regard to the lower limit of each of the formulas (1) and (2), with reference to FIG. 6, as the radius r of the received light flux RB becomes larger, qualitatively, the possibility of vignetting in the vicinity of the first mirror surface M1 becomes higher. Accordingly, in order to avoid this, it is desirable to specify the value of the distance h. Then, in order to determine the lower limit of each of the formulas (1) and (2), the present inventors performed the study in the following examples.

EXAMPLE

The examples performed by the present inventors are described. FIGS. 8 to 11 each shows mirror utilization efficiency of a received light flux with respect to the rotation angle of the mirror unit in the case where the received light flux has a circular cross section. In the example, the study has been performed in such a way that the value of the gravity center position h of the region of a received light flux when the received light flux positioned to confront the first mirror surface is viewed from the direction orthogonal to the optical axis, was changed 1 to 8 mm. Moreover, r was the radius of the region of a received light flux when the received light flux positioned to confront the first mirror surface is viewed from the direction orthogonal to the optical axis. Provided that, the rotation angle of the mirror unit was an angle when the mirror unit was rotated to one side from a position confronting the first mirror surface at which the rotation angle was set to 0 degree. Moreover, in the case where the mirror utilization efficiency is 1, vignetting is not caused in a received light flux, but in the case where the mirror utilization efficiency is 0, a received light flux deviates from a mirror surface, and it means that the perfect vignetting is caused. Furthermore, H was made to H=10 mm. In this connection, the determination criterion of the mirror utilization efficiency was set to 0.35 or more at the mirror unit rotation angles of 30 degrees (a position at 60 degrees on one side in a scanning range). This value of 0.35 was a value in which a detectable distance at a position at 60 degrees on one side in a scanning range became a distance being approximately 60 percent of the detectable distance at the center of the scanning range.

Figure 8:
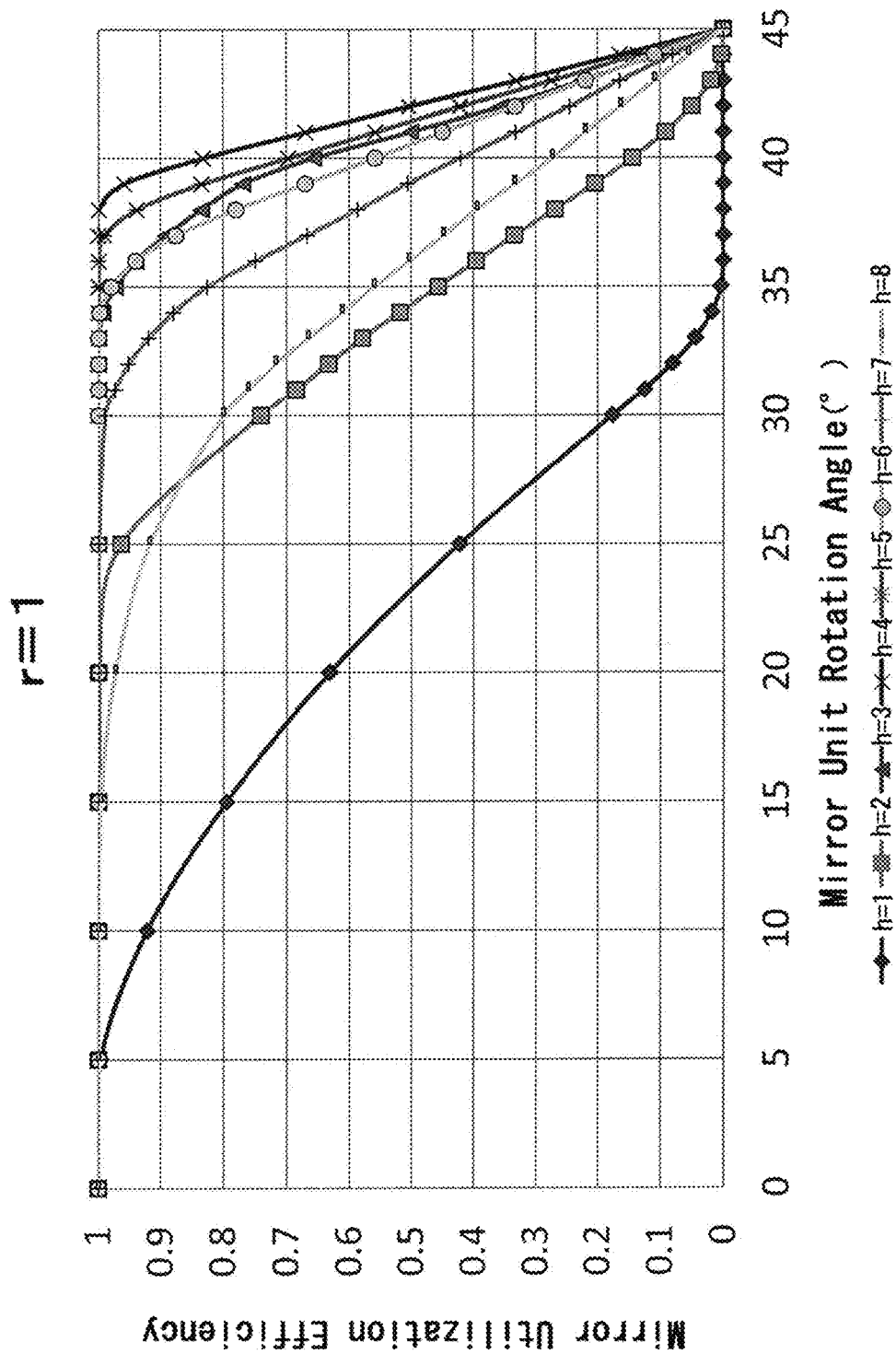
FIG. 8 is a diagram showing mirror utilization efficiency with respect to a rotation angle of a mirror unit in a case where a received light flux has a circular cross section (r=1).

The example shown in FIG. 8 is a case where a radius r of a received light flux is 1 mm (r=1 mm), and in the case of h=1 mm, in the case where the rotation angle of the mirror unit becomes 30 degrees, the mirror utilization efficiency becomes 0.17, which is less than the reference value. On the other hand, in the case of h=2 to 8 mm, the mirror utilization efficiency becomes 0.74 or more, which is higher than the reference value.

Figure 9:
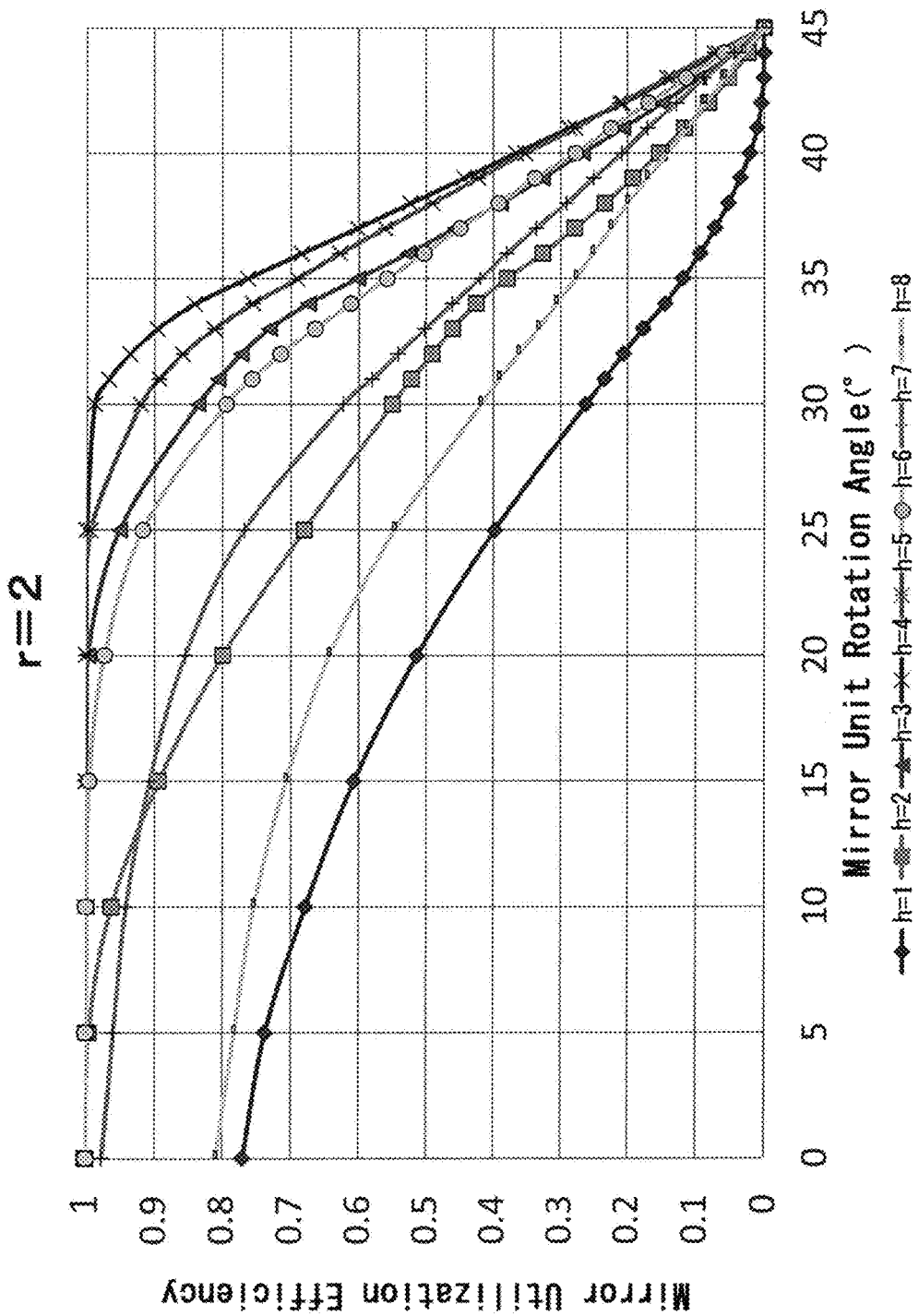
FIG. 9 is a diagram showing mirror utilization efficiency with respect to a rotation angle of a mirror unit in a case where a received light flux has a circular cross section (r=2).

The example shown in FIG. 9 is a case where a radius r of a received light flux is 2 mm (r=2 mm), and in the case of h=1 mm, in the case where the rotation angle of the mirror unit becomes 30 degrees, the mirror utilization efficiency becomes 0.26, which is less than the reference value. On the other hand, in the case of h=2 to 8 mm, the mirror utilization efficiency becomes 0.42 or more, which is higher than the reference value.

Figure 10:
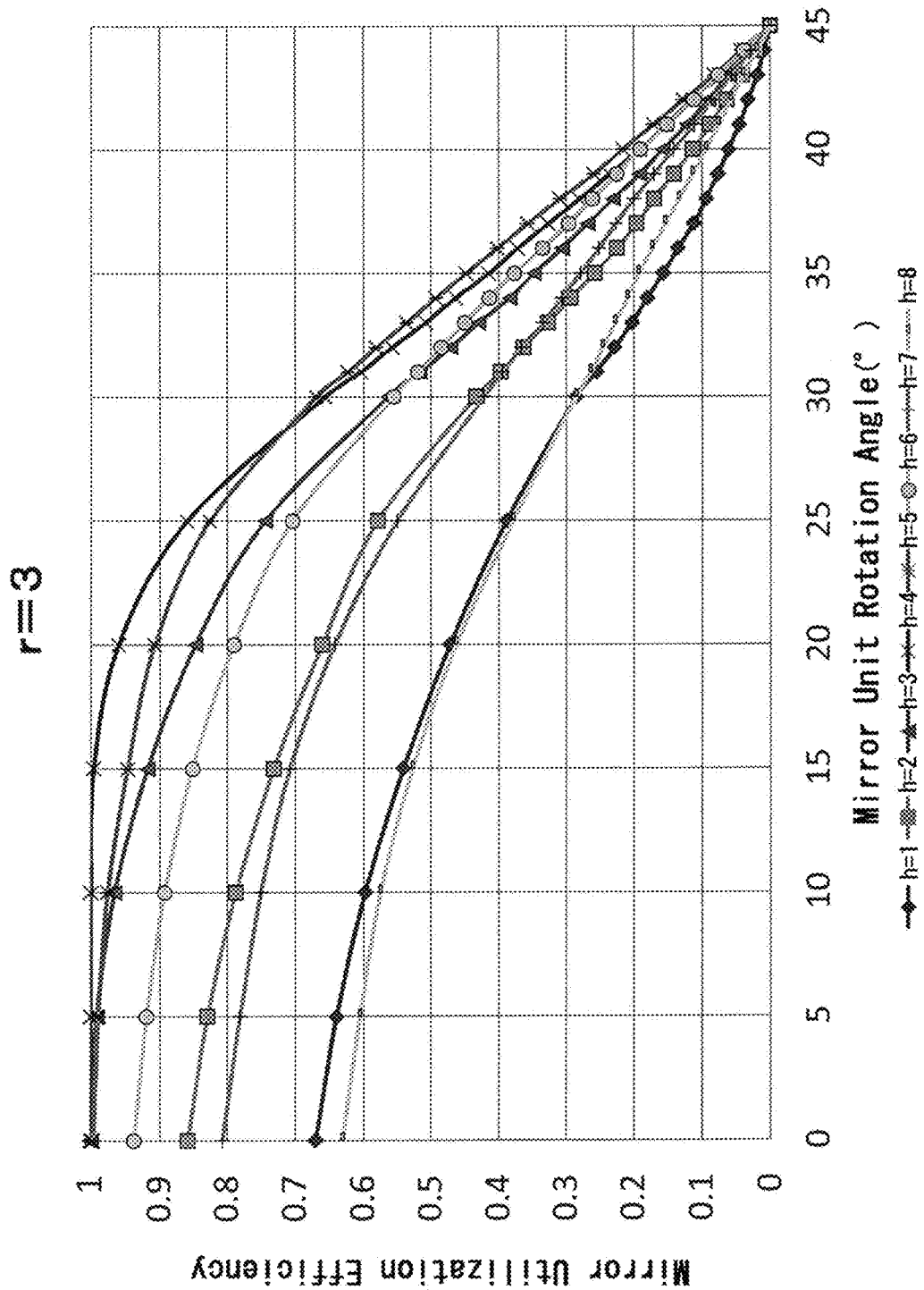
FIG. 10 is a diagram showing mirror utilization efficiency with respect to a rotation angle of a mirror unit in a case where a received light flux has a circular cross section (r=3).

The example shown in FIG. 10 is a case where a radius r of a received light flux is 3 mm (r=3 mm), and in the case of h=1 and 8 mm, in the case where the rotation angle of the mirror unit becomes 30 degrees, the mirror utilization efficiency becomes 0.29, which is less than the reference value. On the other hand, in the case of h=2 to 7 mm, the mirror utilization efficiency becomes 0.43 or more, which is higher than the reference value.

Figure 11:
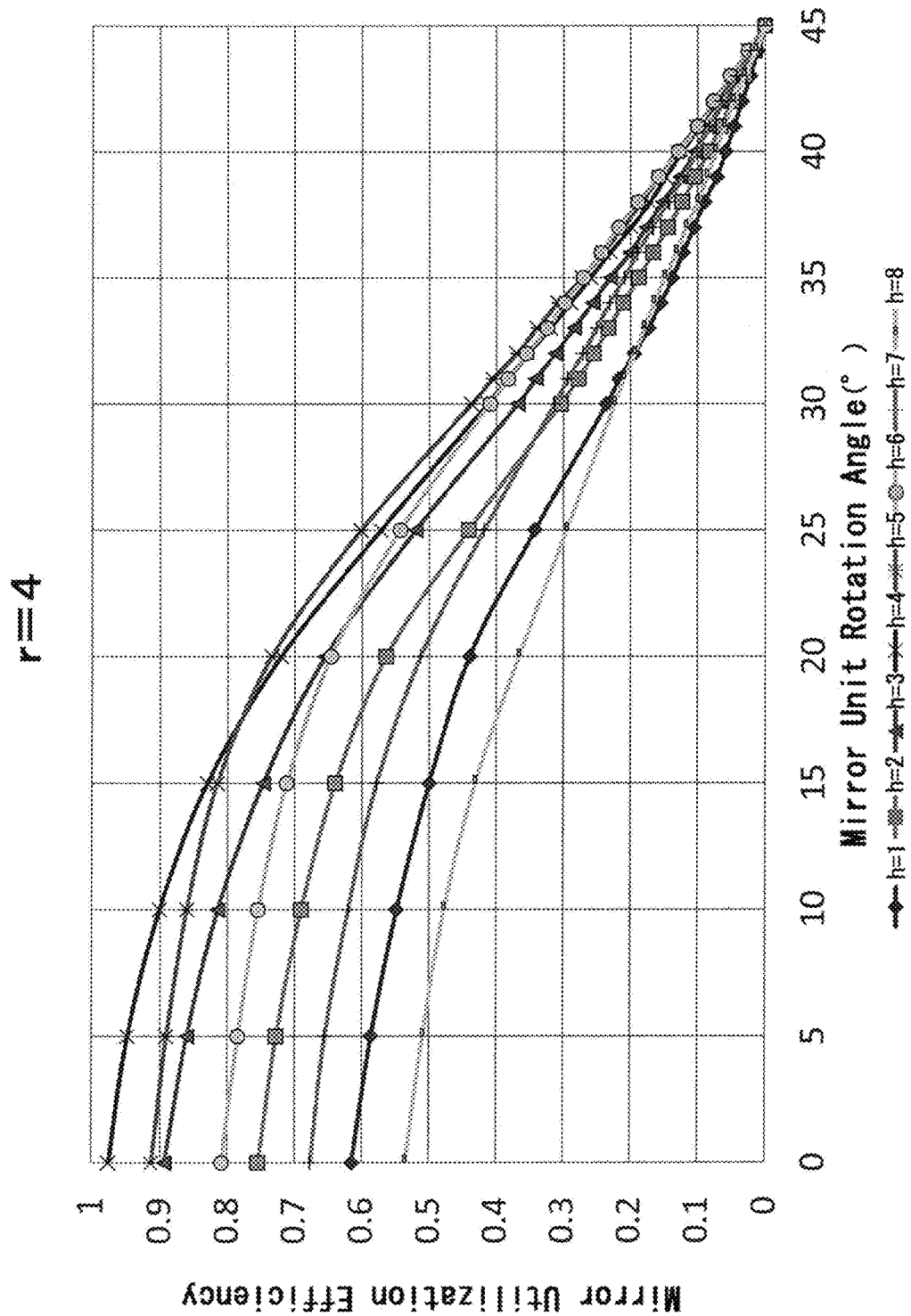
FIG. 11 is a diagram showing mirror utilization efficiency with respect to a rotation angle of a mirror unit in a case where a received light flux has a circular cross section (r=4).

The example shown in FIG. 11 is a case where a radius r of a received light flux is 4 mm (r=4 mm), and in the case of h=1, 2, 7, and 8 mm, in the case where the rotation angle of the mirror unit becomes 30 degrees, the mirror utilization efficiency becomes 0.31 or less, which is less than a reference value. On the other hand, in the case of h=3 to 6 mm, the mirror utilization efficiency becomes 0.37 or more, which is higher than the reference value.

In considering the results of the above study, in the case where r is less than 0.4 H (r=1 to 3 mm), if h exceeds 1 mm at H=10 mm, it is sufficient. Therefore, the lower limit of the formula (1) is determined. On the other hand, in the case where r is 0.4 H or more (r=4 mm), if h exceeds 2 mm at H=10 mm, it is sufficient. Therefore, the lower limit of the formula (2) is determined. It should be noted that if the radius of the received light flux is small, the rate of vignetting of light rays decreases. However, the amount of a received light flux entering the photodiode decreases correspondingly to the small radius. Accordingly, the radius r in the case where the received light flux is shaped in a circle is set in accordance with the specification and the required performance.

FIGS. 12 to 15 each shows mirror utilization efficiency of a received light flux with respect to the rotation angle of the mirror unit in the case where the received light flux has a square cross section. In the example, the study has been performed in such a way that the value of a distance h up to a gravity center position h of the region of a received light flux when the received light flux positioned to confront the first mirror surface is viewed from the direction orthogonal to the optical axis, was changed 1 to 8 mm. Moreover, similarly to the above-mentioned examples, the rotation angle of the mirror unit was an angle when the mirror unit was rotated to one side from a position confronting the first mirror surface at which the rotation angle was set to 0 degree. Moreover, in the case where the mirror utilization efficiency is 1, vignetting is not caused in a received light flux, but in the case where the mirror utilization efficiency is 0, a received light flux deviates from a mirror surface, and it means that the perfect vignetting is caused. Furthermore, similarly, H was made to H=10 mm. In this connection, the determination criterion of the mirror utilization efficiency was set similarly to 0.35 or more at a mirror unit rotation angles of 30 degrees.

Figure 12:
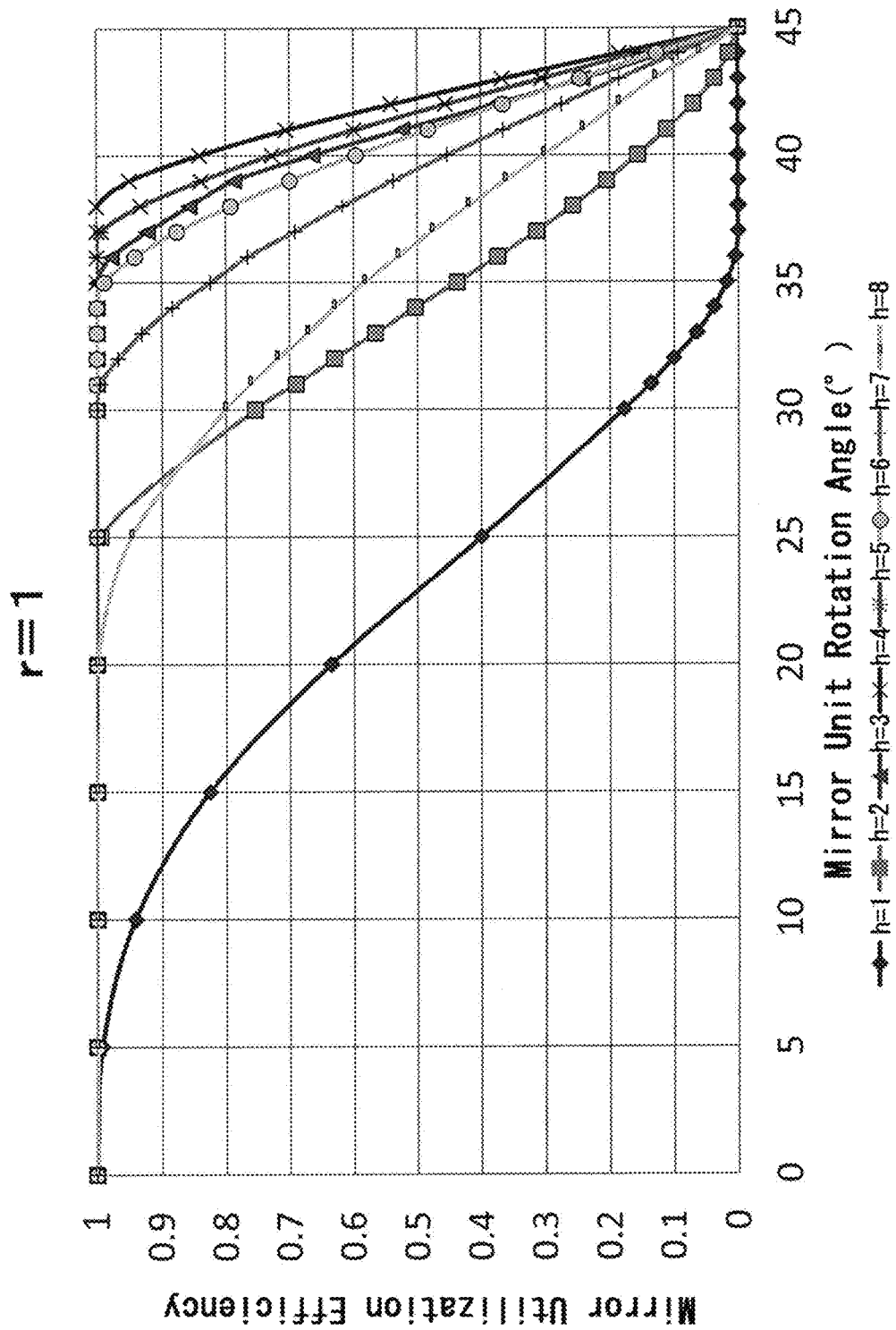
FIG. 12 is a diagram showing mirror utilization efficiency with respect to a rotation angle of a mirror unit in a case where a received light flux has a square cross section (equivalent circle radius r=1).

The example shown in FIG. 12 is a case where the received light flux has a square cross section with an area equal to the area of a circle with a radius r of 1 mm (r=1 mm), and in the case of h=1 mm, in the case where the rotation angle of the mirror unit becomes 30 degrees, the mirror utilization efficiency becomes 0.18, which is less than the reference value. On the other hand, in the case of h=2 to 8 mm, the mirror utilization efficiency becomes 0.75 or more, which is higher than the reference value.

Figure 13:
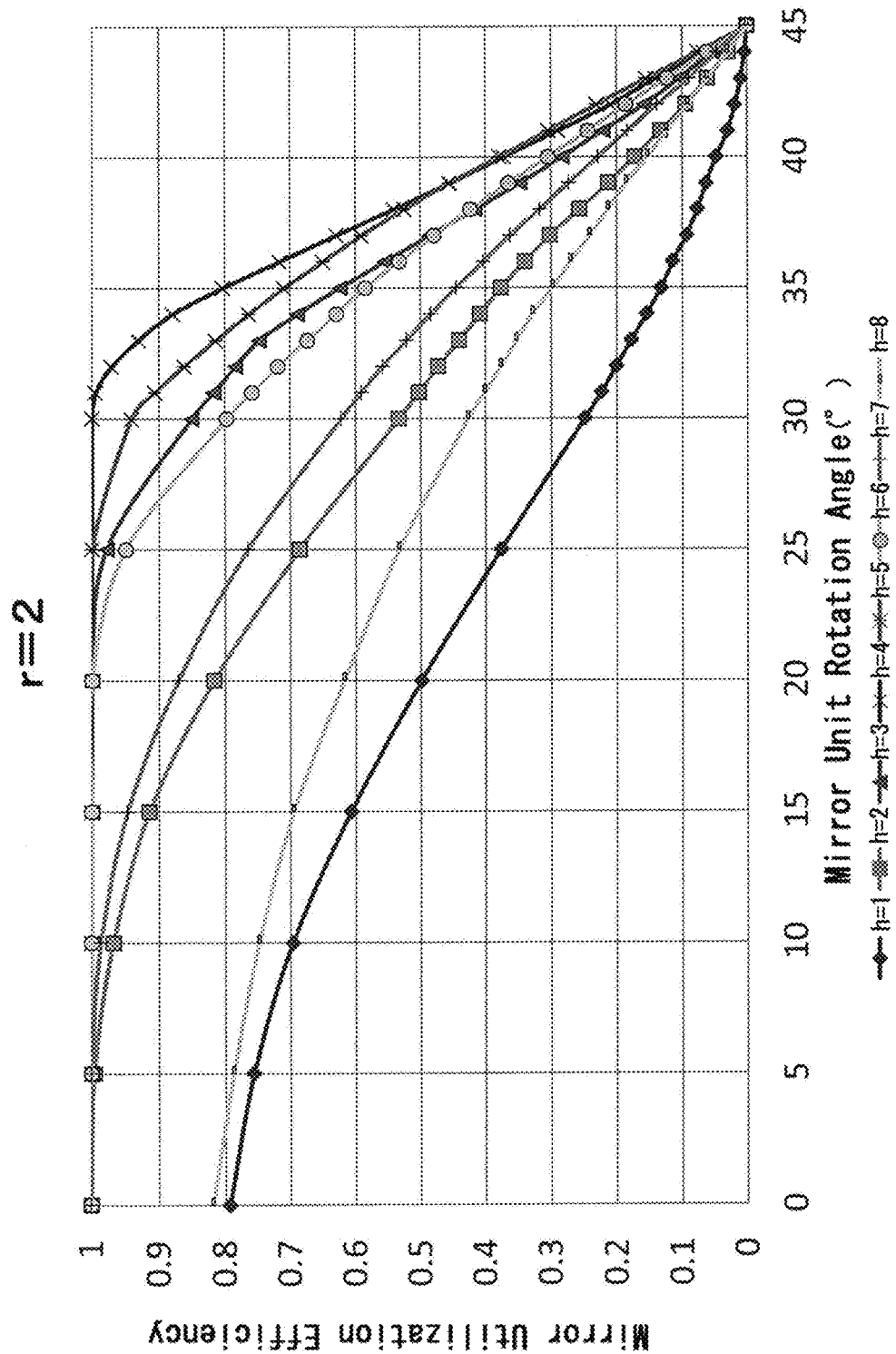
FIG. 13 is a diagram showing mirror utilization efficiency with respect to a rotation angle of a mirror unit in a case where a received light flux has a square cross section (equivalent circle radius r=2).

The example shown in FIG. 13 is a case where the received light flux has a square cross section with an area equal to the area of a circle with a radius r of 2 mm (r=2 mm), and in the case of h=1 mm, in the case where the rotation angle of the mirror unit becomes 30 degrees, the mirror utilization efficiency becomes 0.25, which is less than the reference value. On the other hand, in the case of h=2 to 8 mm, the mirror utilization efficiency becomes 0.43 or more, which is higher than the reference value.

Figure 14:
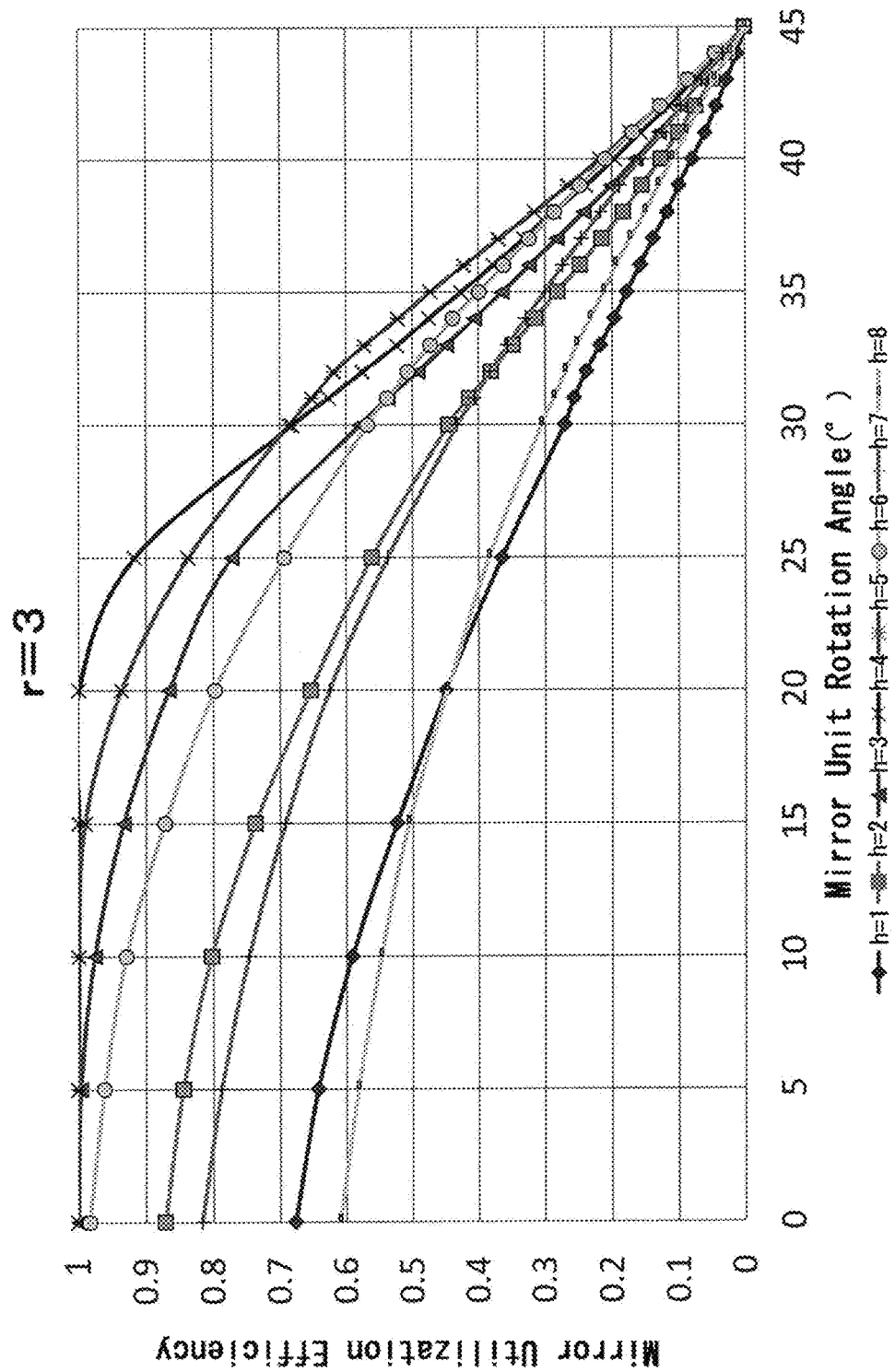
FIG. 14 is a diagram showing mirror utilization efficiency with respect to a rotation angle of a mirror unit in a case where a received light flux has a square cross section (equivalent circle radius r=3).

The example shown in FIG. 14 is a case where the received light flux has a square cross section with an area equal to the area of a circle with a radius r of 3 mm (r=3 mm), and in the case of h=1 and 8 mm, in the case where the rotation angle of the mirror unit becomes 30 degrees, the mirror utilization efficiency becomes 0.31 or less, which is less than the reference value. On the other hand, in the case of h=2 to 7 mm, the mirror utilization efficiency becomes 0.44 or more, which is higher than the reference value.

Figure 15:
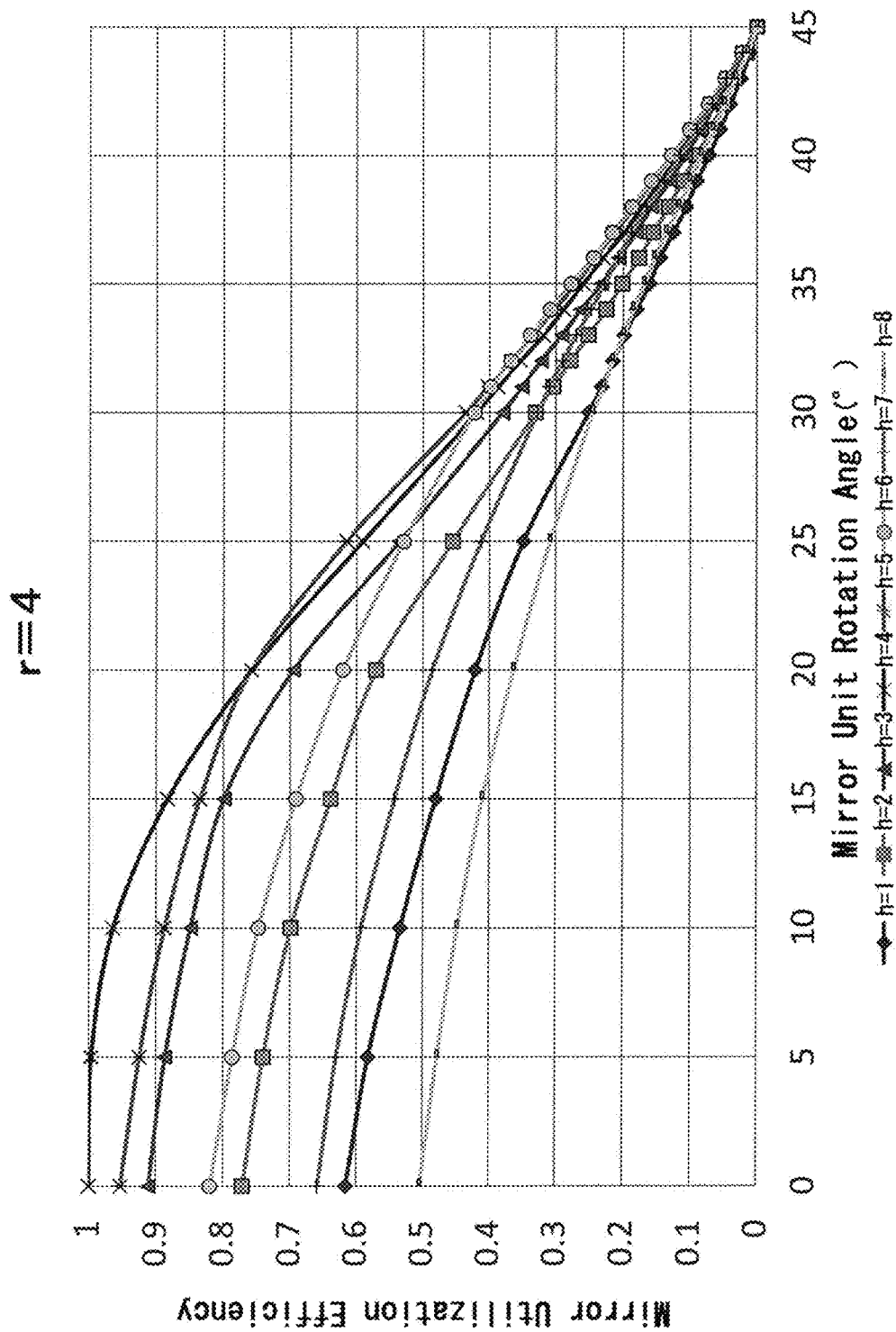
FIG. 15 is a diagram showing mirror utilization efficiency with respect to a rotation angle of a mirror unit in a case where a received light flux has a square cross section (equivalent circle radius r=4).

The example shown in FIG. 15 is a case where the received light flux has a square cross section with an area equal to the area of a circle with a radius r of 3 mm (r=3 mm), and in the case of h=1, 2, 7 and 8 mm, in the case where the rotation angle of the mirror unit becomes 30 degrees, the mirror utilization efficiency becomes 0.33 or less, which is less than the reference value. On the other hand, in the case of h=3 to 6 mm, the mirror utilization efficiency becomes 0.38 or more, which is higher than the reference value.

In considering the results of the above study, even in the case where the received light flux has a square cross section, in the case where a radius r of an equivalent circle with an area to which the area of the square cross section was converted, is less than 0.4 H (r=1 to 3 mm), if the gravity center position h exceeds 1 mm at H=10 mm, it is sufficient. Therefore, the lower limit of the formula (1) is determined. On the other hand, in the case where r is 0.4 H or more (r=4 mm), if h exceeds 2 mm at H=10 mm, it is sufficient. Therefore, the lower limit of the formula (2) is determined. That is, even if a received light flux has a cross section other than a circle, the lower limit of the conditional formulas (1) and (2) becomes the same.

Incidentally, in the above-described embodiment, the description is given for the example where the region of an emitted light flux emitted from the light source occupied on the first mirror surface and the region of a received light flux occupied on the first mirror surface are overlapped with each other. However, the respective regions occupied on the first mirror surface may not be overlapped with each other, and may be located on the respective different positions.

The present invention should not be restricted to the embodiment written in this specification, and it is clear from the embodiment and technical concept written in this specification for the person skilled in the art of the present technical field that the present invention includes other embodiments and modification examples. The description and embodiments written in the specification are merely for exemplification purposes, and the scope of the present invention will be indicated with claims mentioned later. For example, all the contents of the present invention described by using the drawings can be applied to the embodiments, and can be applied to the mounting to flight objects, such as a helicopter, and the security sensors which are installed in buildings and detect a suspicious person. Moreover, in the above-described embodiments, the description has been given on the basis of the case where the semiconductor laser is used as a light source. However, the light source should not be limited to this, and it goes without saying that LEDs or the like may be used as the light source.

REFERENCE SIGNS LIST

1 Vehicle
1a Front window
1b Front grill
CL Collimator lens
CS Casing
G Detection range
LD Semiconductor laser
Ln1 to Ln4 Regions
LPS Light projecting system
LR Laser radar
LS Lens
M1 First mirror surface
M2 Second mirror surface
MR Optical element
MRa Hole
MT Motor
MU Mirror unit
OBJ Object
PD Photodiode
RB Received light flux
RO Rotation axis
RPS Light receiving system
SB Laser spot light flux
SH Shaft
TR Transparent plate
WS Window portion

The invention claimed is:

1. A light scanning type object detecting device, comprising:
a mirror unit in which a first mirror surface and a second mirror surface are formed so as to incline in respective directions intersecting with a rotation axis and to face each other with a predetermined angle;
a light source; and
a light receiving element,
wherein the light scanning type object detecting device is configured such that a light flux emitted from the light source is reflected on the first mirror surface, thereafter, reflected on the second mirror surface, and projected so as to scan by rotation of the mirror unit, and among the light flux projected so as to scan, a part of the light flux scattered on an object is reflected on the second mirror surface, thereafter, reflected on the first mirror surface, and received by the light receiving element,
wherein in the mirror unit, a part of each of the first mirror surface and the second mirror surface that exceeds a predetermined distance from the rotation axis in a direction orthogonal to the rotation axis, is cut out, and
wherein H represents a distance in a direction of the rotation axis between an intersection point of extension lines of lateral sides of the first mirror surface and a first point on the first mirror surface that is most separated from the intersection point in the direction of the rotation axis; r represents a radius of a circle in a case where an area of a region of a received light flux received by the light receiving element when the received light flux positioned to confront the first mirror surface is viewed from a direction orthogonal to the optical axis, is converted into the circle; h represents a distance in the direction of the rotation axis between the first point and a gravity center of a region of a received light flux when the received light flux positioned to confront the first mirror surface is viewed from the direction orthogonal to the optical axis; and H' represents a distance in the direction of the rotation axis between the first point and a second point on the first mirror surface that is most separated from the first point in the direction of the rotation axis, formulas (1) and (2) are satisfied.

$$\text{when } r<0.4H, \ 0.1<h/H \leq (H'-r)/H \tag{1}$$

$$\text{when } r \geq 0.4H, \ 0.2<h/H \leq (H'-r)/H \tag{2}$$

2. The light scanning type object detecting device described in claim 1, wherein the mirror unit includes a plurality of pairs of the first mirror surface and the second mirror surface, and an intersecting angle between the first mirror surface and the second mirror surface is different for each of the plurality of pairs.

3. The light scanning type object detecting device described in claim 1, wherein a region where an emitted light flux emitted from the light source occupies on the first mirror surface and a region where the received light flux occupies on the first mirror surface at least partially overlap with each other.

4. The light scanning type object detecting device described in claim 3, wherein an optical element including a transmissive portion that transmits one of the emitted light flux and the received light flux and a reflective portion that reflects the other one is disposed on an optical path of the emitted light flux from the light source to the first mirror surface and an optical path of the received light flux from the first mirror to the light receiving element.

5. The light scanning type object detecting device described in claim 1, wherein each of the first mirror surface and the second mirror surface is defined by lateral sides, a top side, and a bottom side, and each point on the bottom side of the first mirror surface and the top side of the second mirror surface being equidistant from the rotation axis.

* * * * *